(12) United States Patent
Thaler

(10) Patent No.: US 11,118,516 B2
(45) Date of Patent: Sep. 14, 2021

(54) METHOD FOR CONTROLLING AND/OR REGULATING THE OPERATION OF AN INTERNAL COMBUSTION ENGINE

(71) Applicant: Volkswagen Aktiengesellschaft, Wolfsburg (DE)

(72) Inventor: Tim Thaler, Hannover (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 113 days.

(21) Appl. No.: 16/521,168

(22) Filed: Jul. 24, 2019

(65) Prior Publication Data
US 2020/0032719 A1 Jan. 30, 2020

(30) Foreign Application Priority Data

Jul. 24, 2018 (DE) ..................... 10 2018 212 247.4

(51) Int. Cl.
*F02D 13/02* (2006.01)
*F02D 41/24* (2006.01)
*F02D 41/00* (2006.01)

(52) U.S. Cl.
CPC ..... *F02D 13/0238* (2013.01); *F02D 13/0269* (2013.01); *F02D 41/0007* (2013.01); *F02D 41/2438* (2013.01); *F02D 2200/602* (2013.01)

(58) Field of Classification Search
CPC .. F02D 13/02; F02D 13/0238; F02D 13/0269; F02D 41/00; F02D 41/0007; F02D 41/24; F02D 41/2438; F02D 2200/602
See application file for complete search history.

(56) References Cited

U.S. PATENT DOCUMENTS

| 7,882,821 B2 | 2/2011 | Akihisa et al. |
| 10,018,127 B2 | 7/2018 | Hoffmeyer et al. |
| 10,208,684 B2 | 2/2019 | He et al. |
| 2010/0236523 A1 | 9/2010 | Saruwatari et al. |
| 2015/0211424 A1* | 7/2015 | Nomura ............... F01L 1/352 123/472 |
| 2016/0281615 A1 | 9/2016 | Flynn et al. |

(Continued)

FOREIGN PATENT DOCUMENTS

| DE | 102007039210 A1 | 2/2009 |
| DE | 102012014713 A1 | 1/2014 |

(Continued)

*Primary Examiner* — John Kwon
*Assistant Examiner* — Johnny H Hoang
(74) *Attorney, Agent, or Firm* — Muncy, Geissler, Olds & Lowe, P.C.

(57) ABSTRACT

A method for controlling and/or regulating the operation of an internal combustion engine, wherein the relevant specific relative locations of the intake camshaft with respect to the crankshaft are defined and/or controlled with the aid of regulating control values of the engine control unit, in particular for controlling the intake valves between the control value 1 for late and the control value 0 for early, and wherein a specific regulating control value curve and/or specific regulating control values for controlling the relative position of the intake camshaft is or are stored, at least for a specific control period for implementing the load jump, namely at least between the time of the start of the target load jump to the time of the end of the actual load jump corresponding to the target load jump.

19 Claims, 2 Drawing Sheets

(56) References Cited

U.S. PATENT DOCUMENTS

2018/0223748 A1    8/2018  Tulapark et al.
2019/0316538 A1*  10/2019  Martin .................... F02B 37/10

FOREIGN PATENT DOCUMENTS

| DE | 102012024318 A1 | 6/2014 |
| DE | 112015006302 T5 | 11/2017 |
| DE | 102016212946 A1 | 1/2018 |
| EP | 2054601 A1 | 5/2009 |
| WO | WO2017023333 A1 | 2/2017 |

* cited by examiner

METHOD FOR CONTROLLING AND/OR REGULATING THE OPERATION OF AN INTERNAL COMBUSTION ENGINE

This nonprovisional application claims priority under 35 U.S.C. § 119(a) to German Patent Application No. 10 2018 212 247.4, which was filed in Germany on Jul. 24, 2018 and which is herein incorporated by reference.

BACKGROUND OF THE INVENTION

Field of the Invention

The present invention relates to a method for controlling and/or regulating the operation of an internal combustion engine, in particular an internal combustion engine of a motor vehicle, in particular working at least partially according to the Miller cycle.

Description of the Background Art

In the prior art, firstly, different methods for controlling and/or regulating the operation of an internal combustion engine are known, in particular including the so-called "Miller-cycle engine" or internal combustion engine that is operated according to the so-called Miller cycle. In engines including such "Miller-cycle engines," the relative location or positioning of an intake camshaft with respect to a crankshaft is movable and/or adjustable for controlling intake valves. In other words, the intake valves can be moved from "late" to "early" (and vice versa) through adjustment of the relative location of the intake camshaft. The movement or adjustment of the relative location or of the relative positioning of the intake camshaft with respect to the crankshaft is controlled and/or regulated with the aid of regulating control values of the engine control unit. In general, the regulating control value of the engine control unit for controlling the intake camshaft has a certain second value, in particular the value "1," for moving the intake camshaft or the intake valves to the endpoint "late," and has a certain second value, in particular the value "0," for moving the intake camshaft or the intake valves to the endpoint "early." When the intake camshaft is driven with the regulating control value "1," in particular, an appropriate quantity of air is drawn into the combustion chamber until the cylinder reaches the so-called dead-center point (in particular the regulating control value="1"). In this case, the relevant intake valve closes "late." By means of a suitable movement, for example by driving the intake camshaft with a smaller value, in particular 0.5 or 0.6 for example, the closing time of the relevant intake valve is adjusted or moved from "late" to "early" through the driving of the intake camshaft. In this way, less air is drawn into the combustion chamber and then expanded until the dead-center point is reached. As a result of this, cooler air—viewed thermodynamically—is then compressed and brought to explosion in the combustion chamber. The tendency of the engine to knock is reduced in this way. The tendency of the internal combustion engine to knock, so-called "engine knocking," arises in particular with high gas temperatures in the combustion chamber, which can lead to irregular combustion events, and in particular even to possible engine damage. For this reason, efforts to counteract the tendency of the internal combustion engine to knock are made through appropriate adjustment of the intake camshaft or through control of the intake valves, which is to say through appropriately applying the relative location or positioning of the intake camshaft with respect to the crankshaft.

As a general rule, in a so-called "Miller-cycle engine" less air is combusted and efficiency is better or is increased because the ignition angle of the engine is optimized. The rich-mixture balance present in a Miller-cycle engine is at least partially compensated for by higher charge-air pressures, in particular with the aid of a turbocharger that is present. Thus, when the accelerator pedal is actuated by the driver, a higher target load point of the internal combustion engine is applied in a load jump. In this process, the intake camshaft is moved or adjusted from "early" to "late," so that the relevant intake valves then close correspondingly late, and as a general rule—as compared to the state before the driver actuated the accelerator pedal—more air is drawn into the combustion chamber, in particular in order to also implement the higher actual load point of the internal combustion engine corresponding to the higher target load point.

Thus, for example, a method for operating an internal combustion engine is known from DE 10 2012 014 713 A1, which corresponds to U.S. Ser. No. 10/018,127 and is incorporated herein by reference, in which a dynamic setpoint for the internal combustion engine is determined as a function of a difference between a load requirement on the internal combustion engine and a current load output of the internal combustion engine. In other words, a dynamic setpoint is determined for the difference between an increased target load point and an existing or applied actual load point of an internal combustion engine. In addition, a compressor for setting a charge density in an intake manifold of the internal combustion engine is provided as well as the customary adjuster, which is to say, in particular, that the intake valves controllable by means of the intake camshaft are also present. A volumetric efficiency and the charge density are now set appropriately as a function of the above-described dynamic setpoint. In particular, in this design the so-called volumetric efficiency is implemented with the aid of the control of the intake valves or the movement of the intake camshaft. In this design, a dynamic influencing of the setpoint for the volumetric efficiency is also carried out or implemented by determination of the dynamic setpoint, in particular of a dynamic factor, from the speed of accelerator pedal motion. Or, stated in yet another way, the volumetric efficiency of the internal combustion engine is adjusted or controlled and/or regulated as a function of the dynamic setpoint, in particular also as a function of the relevant acceleration of the actuation of the accelerator pedal by the driver.

In the methods known in the prior art, in particular for controlling and/or regulating the operation of an internal combustion engine of a motor vehicle, which in particular work at least partially according to the Miller cycle, some of these methods are still not optimally developed. The Miller cycle finds application in particular for purposes including reducing the $CO_2$ emissions in Otto engines supercharged by exhaust-gas turbochargers. An expansion, and thus a cooling, of the fresh air in the combustion chamber is achieved by this means during the intake stroke of the internal combustion engine. In this way, the tendency to knock, the so-called "engine knocking" of the internal combustion engine, is reduced, wherein the main focus of the combustion in the internal combustion engine can be displaced towards higher efficiency through earlier ignition of the air/fuel mixture in the combustion chamber.

The reduction in the volumetric efficiency of the internal combustion engine associated with the earlier closing of the intake valves with the Miller cycle results in a higher intake manifold pressure level as compared to internal combustion engines with conventional combustion methods at the same load point, and thus results in a higher charging level to be ensured by the exhaust-gas turbocharger.

In the methods hitherto known in the prior art, a sluggish pressure build-up by the exhaust-gas turbocharger in the event of load jumps is counteracted by the means that the relative position of the intake camshaft is moved in the direction "late" to increase the mass flow rate, which is to say in the direction of a later opening angle of the intake valves. As a result, the effective compression of the mixture in the compression chamber also increases. The exhaust camshaft is moved to the same degree in the direction of an earlier opening angle of the exhaust valves to reduce the effect of the increasing exhaust gas back pressure on the fresh air charge. This intake camshaft movement, which in particular is dynamic, takes place in a manner regulated on the basis of the difference between the fresh air charge required for the higher target load point and the fresh air charge currently present in the combustion chamber, in particular based on regulating control values calculated and/or stored in the engine control unit.

As practice has demonstrated, however, dynamic intake camshaft movement based on the above-described difference sometimes is still not optimal or is problematic, because depending on the specific load jump and/or the history of the engine the raising of the above-mentioned effective compression can increase the engine's tendency toward irregular combustion events, and in particular can increase the tendency of the internal combustion engine to knock, or so-called "engine knocking" can then occur. For this reason, until now in the prior art the abovementioned dynamic intake camshaft movement is deactivated when a defined load threshold is exceeded and/or when a specific load jump is implemented, so that no further increase in the effective compression then takes place, especially at critical stationary operating points of the internal combustion engine, so the internal combustion engine is then appropriately protected in this way. However, as a result of the deactivation of the intake camshaft movement, it is also no longer possible then for the full potential in establishing the charging of the air/fuel mixture in the combustion chamber to be increased or achieved. The internal combustion engine or its responsiveness reacts in a "sluggish" manner.

SUMMARY OF THE INVENTION

It is therefore an object of the present invention to develop and improve the methods known in the prior art for controlling and/or regulating the operation of an internal combustion engine such that the abovementioned disadvantages are avoided, and in particular a control and/or regulation of the intake camshaft can be implemented in such a manner that an effective compression is made possible in the internal combustion engine, in particular without the risk of engine knocking, and in particular a sluggish responsiveness of the internal combustion engine is reduced and/or avoided.

In the method for controlling and/or regulating the operation of an internal combustion engine, in particular the internal combustion engine of a motor vehicle, wherein, in particular, the internal combustion engine can be operated or works at least partially according to the Miller cycle, multiple different target load points and/or multiple different actual load points of the internal combustion engine can now be applied, in particular by an appropriate actuation of the accelerator pedal.

In the case of an appropriate load jump, namely a load increase of the internal combustion engine, starting from at least one specific applied, lower, first target load point and/or starting from a first actual load point implemented for the first target load point, a specific, higher, second target load point—compared to the first target load point and/or compared to the implemented actual load point—is then applied. The latter is, in particular, implemented by an appropriate actuation of the accelerator pedal by the driver, for example when the driver wants to sharply accelerate the motor vehicle, in particular rapidly, by a relatively abrupt actuation of the accelerator pedal ("hitting the gas" hard).

The relative location or the relative positioning of an intake camshaft with respect to a crankshaft is appropriately movable and/or adjustable for controlling intake valves. In particular, the relevant control of the intake valves from "early" to "late" (or vice versa) can be implemented through the relative position of the intake camshaft. The relevant specific relative locations of the intake camshaft with respect to the crankshaft are controlled and/or regulated fundamentally with the aid of regulating control values of the engine control unit. In particular, regulating control values are defined here for controlling the intake camshaft or for controlling the intake valves, in particular between the control value "1" for the end position "late" and, in particular, the control value "0" for the end position "early." The relevant specific relative locations of the intake camshaft with respect to the crankshaft are thus defined and/or controlled fundamentally with the aid of regulating control values of the engine control unit, which are located in particular between the control values "1" and "0" (for example, 0.6, 0.7, 0.8, 0.9, etc.).

For at least a specific control period for implementing the load jump, namely a load increase, namely from the time of the start of the target load jump of the internal combustion engine or from the start of the relevant target demand until the time of the end of the actual load jump corresponding to the target load jump, which is to say until the time when the actual load point has essentially reached the desired (second, higher) target load point or when the actual load point corresponds to the higher, second target load point, a specific regulating control value curve and/or specific regulating control values for controlling the relative position of the intake camshaft is or are stored and/or saved in the engine control unit.

The abovementioned disadvantages are now avoided, firstly, by the means that at least for the abovementioned specific control period, a regulating control limit curve is determined and/or regulating control limit values are defined and/or calculated, wherein a comparison of the relevant regulating control values with the relevant regulating control limit values then takes place at specific relevant times within the control period, in particular constantly or continuously, and wherein the relevant lower control value (of the two above-named values, which is to say either the corresponding lower regulating control value or the corresponding lower regulating control limit value) is then used to drive the relative location or positioning of the intake camshaft. In other words, the control of the positioning travel of the intake camshaft is limited situationally in order to achieve a maximally usable effective compression ratio in the combustion chamber, wherein, however, engine knocking is prevented with the aid of regulating control limit values. In particular, the "load history" of the internal combustion engine is taken into account here. This is explained below in still greater detail:

Firstly, through the use of the relevant lower control value, a movement of the intake camshaft is appropriately limited to this lower control value or to the relevant lower value. Through the use of the lower control value/value, the intake camshaft is moved less in the late direction than would be the case if the higher value were used. In particular, so-called engine knocking is prevented in this way.

During the control period, relevant specific stationary regulating control limit values are initially defined for multiple relevant specific actual load points of the internal combustion engine, or a stationary regulating control limit curve is determined and/or defined for the control period, in particular saved in the engine control unit. As a result of the stationary regulating control limit curve, corresponding stationary regulating control limit values are defined in the control period. The abovementioned specific stationary regulating control limit values have been determined for stationary actual load points of the internal combustion engine, in particular on a test stand for stationary specific actual load conditions of the internal combustion engine. The latter are then saved and/or stored in the engine control unit, in particular through parameter data sets, through corresponding characteristic maps, and/or a corresponding stationary regulating control limit curve is then stored. However, it is also possible that for different specific load jumps, corresponding relevant specific stationary regulating control limit values and/or relevant specific stationary regulating control limit curves are then saved and/or stored in each case for a specific load jump.

In the exemplary method, so-called dynamic regulating control limit values or a dynamic regulating control limit curve can be determined and/or calculated, namely with the aid of the relevant specific stationary regulating control limit values and/or with the aid of the relevant stationary regulating control limit curve. In this process, the relevant dynamic regulating control limit values or the relevant dynamic regulating control limit curve are determined and/or calculated with the aid of the relevant specific stationary regulating control limit values as a function of a relevant combustion chamber heating or as a function of a curve of a combustion chamber heating, in particular, namely based on specific characteristic delay times for a relevant combustion chamber heating.

As background, it is once again noted that a thermal equilibrium state is established in the combustion chamber for stationary, in particular constant, actual load points of the internal combustion engine. Through appropriate experiments, in particular on the test stand, it is possible to determine what maximum increase in the effective compression ratio is possible with the aid of the movement of the intake camshaft for this specific relevant stationary actual load point. In other words, a corresponding specific stationary regulating control limit value can be determined accordingly for a relevant specific actual load point. Now, if the actual load point changes, then the stationary thermal equilibrium also changes. This does not take place abruptly, however, but rather with the inertia of the temperature change in the wall of the combustion chamber, hence as a function of the temperature of the combustion chamber and/or of the introduction of energy into the combustion chamber. Dynamic regulating control limit values can then be determined and/or calculated from the specific stationary regulating control limit values as a function of determined "characteristic delay times for the relevant combustion chamber heating." These dynamic regulating control limit values, or the dynamic regulating control limit values arising from the dynamic regulating control limit curve, are then used as the relevant regulating control limit values in the abovementioned comparison of the relevant values in the especially preferred embodiment of the method according to the invention. Consequently, in the especially preferred embodiment of the method, the regulating control values are compared with the relevant regulating control limit values within the above-mentioned control period in the above-mentioned comparison of the relevant values, wherein these regulating control limit values are then the above-mentioned dynamic regulating control limit values as described previously. In this process, characteristic values or characteristic delay times for relevant combustion chamber heating are determined and/or have correspondingly been determined beforehand on a test stand, in particular for relevant different load jumps as well, wherein the relevant value of a delay time then corresponds to the time periods or corresponds to the delay time before the internal combustion engine has reached its new, stationary heating state, in particular with a constant temperature of the combustion chamber wall. Or, stated in yet another way, characteristic delay times, especially for specific different load jumps, are stored and/or saved or are determined in advance on test stands. Here, the relevant characteristic delay time or the relevant value corresponds to a relevant delay time for the internal combustion engine when it has reached an actual load point, in particular the desired load point, after which it has also reached its new, stationary heating state for this actual load point. In particular, in this way the "load history" of the internal combustion engine is also taken into account in the control of the internal combustion engine.

The pressure in the intake system is at least partially controlled and/or achieved with the aid of an exhaust-gas turbocharger that is present; in particular, through the method according to the invention the sluggishness of the internal combustion engine is avoided in the case of load jumps, especially load increases, wherein the method according to the invention can in particular be implemented in an internal combustion engine designed as an Otto engine. A control and/or regulating circuit is now provided, wherein at least one first circuit element designed as a comparing element and at least one second circuit element designed as a time delay element are present.

Firstly, the regulating control values that are fundamentally stored in the engine control unit by the engine control unit are routed to the first circuit element through a first control path.

A second control path is provided that has two sub-paths, wherein a stationary regulating control limit value is routed to the second circuit element through the first sub-path and a value for a characteristic delay time of the combustion chamber heating is routed through the second sub-path.

The second circuit element determines a dynamic regulating control limit value based on the value routed to the second circuit element.

The selection of the minimum and/or a comparison takes place with the aid of the first circuit element, wherein the dynamic regulating control limit value of the second circuit element is routed to the first circuit element, wherein the relevant lower value or control value is used for driving the relative location of the intake camshaft, so that the movement of the intake camshaft in the "late" direction is limited to this value/control value at a maximum.

As explained above, the regulating control value curve is fundamentally stored in the engine control unit. The other curves and/or control values/values can also be stored and/or calculated in the engine control unit, in particular with the aid of a data memory and/or microprocessor. The corresponding regulation and/or control or the method according to the invention can thus be implemented in particular with the aid of the engine control unit and/or of a microprocessor or microcomputer. As a result, the abovementioned disadvantages are avoided, and corresponding advantages are achieved.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
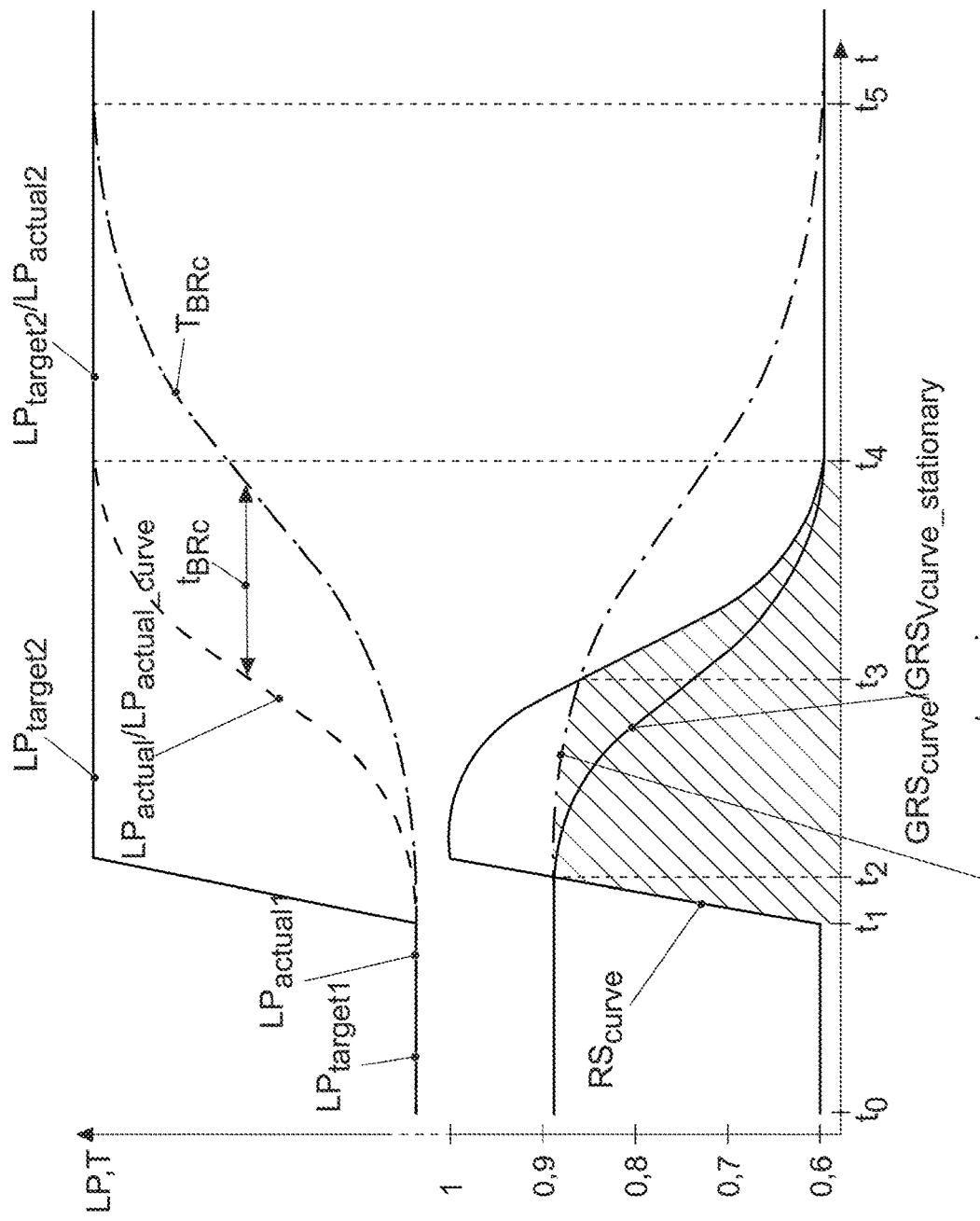
FIG. 1 is a schematic representation of the method according to an exemplary embodiment implemented in an internal combustion engine, in particular a regulating control limit curve and/or specific regulating control limit values for a specific control period, namely for a load jump, in particular for a load increase of the internal combustion engine.
Figure 2:
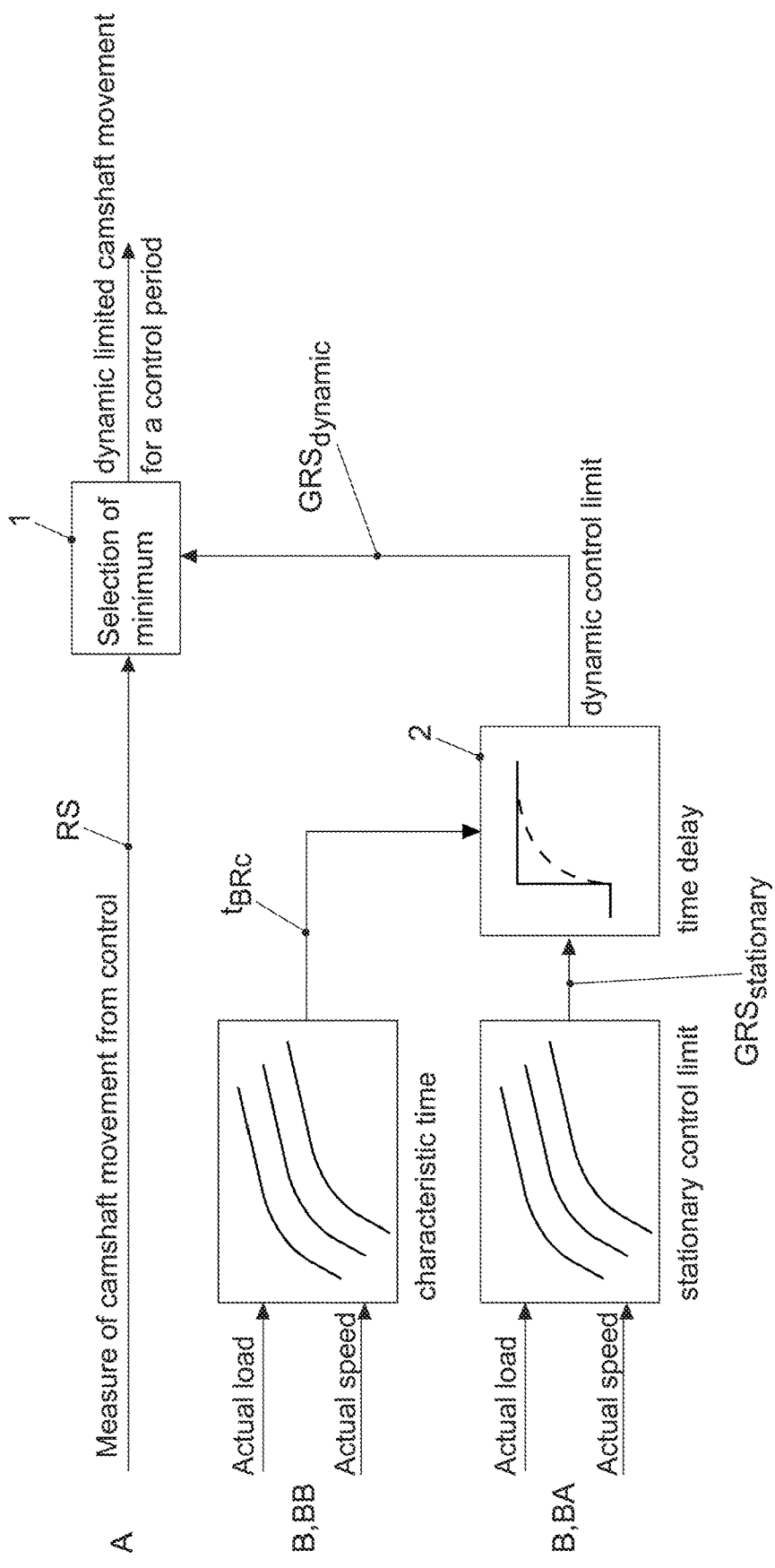
FIG. 2 is a schematic block diagram of a partial section of the control system for controlling and/or regulating the operation of an internal combustion engine using the method according to the invention.

FIGS. 1 and 2 show—at least partially—an exemplary method according to the invention for controlling and/or regulating the operation of an internal combustion engine, in particular of an internal combustion engine of a motor. In this case the internal combustion engine is, in particular, at least partially controlled and/or regulated according to the Miller cycle.

FIG. 1 shows a load jump, namely a load increase of the internal combustion engine, over the course of the time t. In the case of an internal combustion engine, multiple different target load points and/or actual load points of the internal combustion engine can be applied in a known manner, in particular by an appropriate actuation of the accelerator pedal.

FIG. 1 shows here a load jump, namely a load increase of the internal combustion engine to a specific, higher, second target load point $LP_{Target2}$ starting from at least one specific applied, lower target load point $LP_{Target1}$ and/or starting from a first actual load point $LP_{Actual1}$ implemented for the first target load point $LP_{Target1}$. In this case, the higher, second target load point $LP_{Target2}$ is correspondingly higher or greater compared to the first target load point $LP_{Target1}$ or compared to the corresponding actual load point $LP_{Actual1}$, as is clearly visible from FIG. 1 and/or as is correspondingly shown by the curve of the line illustrating the load jump. In addition, it is evident from FIG. 1 that the actual load points $LP_{Actual}$ of the internal combustion engine ramp up during the load jump from $LP_{Actual1}$ to $LP_{Target2}/LP_{Actual2}$, in particular ramp up with a corresponding time delay. This is evident from the representation in FIG. 1, in particular the representation of the load points LP on the (upper) y-axis over the time t.

The relative location or relative positioning of an intake camshaft with respect to a crankshaft for controlling intake valves is appropriately movable and/or adjustable. The relevant control of the intake valves from "early" to "late" (or vice versa) can be achieved through the relative position of the intake camshaft, as already explained above. The relevant specific relative locations of the intake camshaft with respect to the crankshaft are first defined and/or controlled fundamentally with the aid of regulating control values of the engine control unit (see also FIG. 2 in this regard). In this process, the regulating control values take on values between the control value "1," in particular, for a "late" end position, and the control value "0," in particular, for an "early" end position.

In FIG. 1, the regulating control values RS or the corresponding curve of the regulating control values $RS_{Curve}$, which is to say the corresponding regulating control value curve $RS_{Curve}$, are represented by the corresponding line. The corresponding regulating control value curve $RS_{Curve}$ is shown over the time t, wherein, as indicated on the y-axis, the corresponding regulating control value RS, in particular values between "1" and "0" here, should then be shown on the (lower) y-axis.

For a specific control period for implementing the load jump, namely the load increase, namely at least from the time $t_1$ at the start of the target load jump until the time $t_4$ at the end of the actual load jump corresponding to the target load jump, a specific regulating control value curve $RS_{Curve}$ and/or specific regulating control values RS for controlling the relative position of the intake camshaft are stored, in particular are fundamentally saved in the engine control unit, as is evident from FIG. 1.

As is also clear from FIG. 1, a first actual load point $LP_{Actual1}$, which is defined by the driver through a first target load point $LP_{Target1}$, in particular through the accelerator pedal position, is present at time $t_0$ or between times $t_0$ and $t_1$. The driver now calls for a load jump at time $t_1$, namely a load increase, in particular actuates the vehicle's accelerator pedal, so that the second target load point $LP_{Target2}$ is now applied in control terms in order to shift the actual load point $LP_{Actual1}$ of the internal combustion engine in the direction of the second target load point $LP_{Target2}$ or to implement the actual load jump.

Shown in FIG. 1 are the actual load points $LP_{Actual}$ of the internal combustion engine or the curve of the actual engine loads after the corresponding target load point demand, which ramp up over the time t, here from the time $t_1$ in the direction of the second target load point $LP_{Target2}$ until the time $t_4$, wherein the actual load jump is completed at time $t_4$, namely the corresponding actual load point $LP_{Actual}/LP_{Actual2}$ then corresponds to the second target load point $LP_{Target2}$.

It can also be seen from FIG. 1 that, at least for the specific control period between the times $t_1$ and $t_4$, at least one regulating control limit curve $GRS_{Curve}$ (here a first and second regulating control limit curve $GRS_{Curve}$) is determined and/or specific regulating control limit values GRS are defined (or can be calculated in the engine control unit), wherein, according to the method in accordance with the invention, a comparison of the relevant regulating control values RS with the relevant regulating control limit values GRS then takes place at specific relevant times t during the control period, and wherein the relevant lower control value is then used to drive the relative location of the intake camshaft. The abovementioned disadvantages are avoided or reduced by this means.

To illustrate the results of the aforementioned comparison, a specific region between the times $t_1$ and $t_4$ is shown hatched in FIG. 1. At least in this region, the lower control value in each case is used for moving the intake camshaft, or the movement of the intake camshaft is then correspondingly limited, in particular to a maximum of this value in the "late" direction.

As is now also clear from FIG. 1, within the control period here, in particular between the times $t_1$ and $t_4$ here, relevant specific stationary regulating control limit values $GRS_{stationary}$ are now associated with multiple relevant specific actual load points $LP_{Actual}$ or are defined correspondingly and/or a stationary regulating control limit curve $GRS_{Curve\_stationary}$ is determined and/or defined for the control period, as is schematically represented by the curve of the line. In particular, corresponding regulating control limit values $GRS_{stationary}$ are saved for specific actual load points $LP_{Actual}$ of the internal combustion engine (in particular, are saved in characteristic maps and/or are correspondingly "populated with data"). These specific relevant stationary regulating control limit values $GRS_{stationary}$, which are associated with specific relevant stationary actual load points $LP_{Actual}$ of the internal combustion engine, have been determined in advance, in particular on a test stand for stationary specific actual load conditions of the internal combustion engine. The specific stationary regulating control limit values $GRS_{stationary}$ are saved and/or stored in the engine control unit, in particular as a characteristic map and/or are stored in the engine control unit as a stationary regulating control limit curve $GRS_{Curve\_stationary}$.

The regulating control limit curve $GRS_{Curve\_stationary}$ that can be seen in FIG. 1 is a "first" regulating control limit curve $GRS_{Curve}$ here. These values/control values defined in this way could already be used for the abovementioned comparison and for carrying out the method according to the invention, with the relevant smaller value/control value then being used for driving the relative location of the intake camshaft. In the especially preferred embodiment of the method according to the invention, however, a relevant dynamic regulating control limit value $GRS_{dynamic}$ is used for the comparison mentioned above, in particular the "second" regulating control limit curve $GRS_{Curve}$ visible in FIG. 1, which corresponds to a dynamic regulating control limit curve $GRS_{Curve\_dynamic}$; this is described again in greater detail below in the explanation of the especially preferred embodiment of the invention.

In particular, it is also possible that a multiplicity of such stationary regulating control limit curves for an extremely wide variety of load jumps, which is to say for an extremely wide variety of load increases, can be stored in the engine control unit, wherein the individual relevant actual load points of the internal combustion engine are then associated with the corresponding stationary regulating control limit values for specific load jumps. Fundamentally, however, relevant specific stationary regulating control limit values $GRS_{stationary}$ are associated, in particular, with at least the relevant specific actual load points of the internal combustion engine, in particular independently of desired load jumps.

As FIG. 1 also shows, the combustion chamber heating $T_{BRC}$ is likewise represented over the time t by the corresponding line for the load jump represented here in FIG. 1 or the load increase represented here. The corresponding dash-dotted line $T_{BRC}$ in FIG. 1 is intended to schematically represent the combustion chamber heating for the load jump or for the load increase of the internal combustion engine shown here. This line $T_{BRC}$, which in particular is determined virtually, results and/or is defined on the basis of characteristic delay times $t_{BRC}$, wherein a characteristic delay time $t_{BRC}$ is represented by way of example here in FIG. 1 as a horizontal arrowed line between the curve $LP_{Actual\_curve}$ and the line $T_{BRC}$. In particular, a relevant characteristic delay time $t_{BRc}$ is associated with each actual load point $LP_{Actual}$ of the internal combustion engine, in particular is saved in a characteristic map and/or correspondingly "populated with data," wherein this relevant characteristic delay time or the relevant value defined thereby corresponds to a delay time that the internal combustion engine requires from achievement of the relevant actual load point $LP_{Actual}$ until the internal combustion engine has then also achieved its new, stationary heating state. Or in other words: A relevant characteristic delay time $t_{BRc}$, in particular determined on a test stand, is associated in particular with each different specific actual load point $LP_{Actual}$ of the internal combustion engine, with the aid of which delay time the (virtual) line shown here in FIG. 1 is produced for the combustion chamber heating $T_{BRC}$. In particular, a corresponding, stationary new, in particular higher, temperature is present in the new, stationary heating state of the combustion chamber, which also merits mention here.

With the aid of the relevant specific stationary regulating control limit values $GRS_{stationary}$, dynamic regulating control limit values $GRS_{dynamic}$, likewise represented by the line visible in FIG. 1 of the dynamic regulating control limit curve $GRS_{Curve\_dynamic}$ shown here, are now determined and/or calculated as a function of the combustion chamber heating $T_{BRC}$ or of the relevant characteristic delay time $t_{BRc}$ (for the relevant "characteristic combustion chamber heating"). As is evident in FIG. 1, the corresponding dynamic regulating control limit curve $GRS_{Curve\_dynamic}$ has a similar characteristic to the combustion chamber heating $T_{BRC}$ (except reflected at an x-axis having a parallel displacement). In other words, in order to determine/calculate the dynamic regulating control limit curve $GRS_{Curve\_dynamic}$ or the relevant dynamic regulating control limit values $GRS_{dynamic}$, the stationary regulating control limit curve $GRS_{Curve\_stationary}$ is time delayed or is time delayed in control terms, in particular based on the relevant characteristic delay times $t_{BRc}$.

According to the exemplary embodiment of the method according to the invention, the relevant dynamic regulating control limit values $GRS_{dynamic}$ and/or the dynamic regulating control limit values $GRS_{dynamic}$ arising from the dynamic regulating control limit curve $GRS_{Curve\_dynamic}$ are now used as the relevant regulating control limit values GRS for the comparison with the regulating control values RS.

Consequently, in the especially preferred embodiment of the method according to the invention the "second" regulating control limit curve $GRS_{Curve}$ visible here in FIG. 1, which corresponds to the dynamic regulating control limit curve $GRS_{Curve\_dynamic}$, is used for the abovementioned comparison, which is to say the corresponding dynamic regulating control limit values $GRS_{dynamic}$ are used for the comparison with the regulating control values RS. The relevant lower value is then used for carrying out the method according to the invention in the especially preferred embodiment, namely for control/adjustment of the intake camshaft, in particular in order to limit the movement of the intake camshaft in the "late" direction to a maximum of this value/control value.

In FIG. 1, the hatched region, which is intended here to clarify the selection or the selection region of the relevant smaller or lower control values, results from the illustration between the times $t_1$ and $t_4$. In other words, the "peak" of the regulating control value curve $RS_{Curve}$ projecting above the hatched region is "cut off," or these regulating control values RS defined in this way are not taken into account in the method according to the invention. As FIG. 1 shows, only the corresponding regulating control values RS that are between the times $t_1$ and $t_2$ or $t_3$ and $t_4$, and which in particular are below the dynamic regulating control limit curve $GRS_{dynamic}$, in other words only the specific regulating control values RS in the time periods $t_1$ and $t_2$ or $t_3$ and $t_4$, are then used for control in the method according to the invention. In particular, in the time period between the times $t_2$ and $t_3$, the dynamic regulating control limit values $GRS_{dynamic}$ are then used for the method according to the invention in the especially preferred embodiment. Quite fundamentally, it is also possible that in a different embodiment of the method according to the invention, the "first" curve $GRS_{Curve}$ of the stationary regulating control limit values $GRS_{stationary}$ also shown in FIG. 1 is then used "for example for the comparison of the regulating control values RS" with the relevant regulating control limit values GRS. This is also fundamentally possible, although in the especially preferred embodiment, as mentioned above, the dynamic regulating control limit curve $GRS_{Curve\_dynamic}$ is used as the regulating control limit curve $GRS_{Curve}$, in particular for the relevant comparison, since it is possible in this design to realize the greatest potential of the internal combustion engine, in particular without the risk of engine knocking.

In particular, the method according to the invention is implemented in an internal combustion engine designed as an Otto engine, wherein the pressure in the intake system is at least partially achieved and/or controlled with the aid of an exhaust-gas turbocharger that is provided.

In particular, the relevant characteristic map and/or the relevant dynamic regulating control limit curve $GRS_{Curve\_dynamic}$ is then also determined and/or calculated, in particular based on a relevant stationary regulating control limit curve $GRS_{Curve\_stationary}$ and based on a characteristic combustion chamber heating "$T_{BRC}$" or on the characteristic delay times $t_{BRc}$ corresponding thereto, as explained above.

Finally, FIG. 2 shows a schematic block diagram, in particular a schematic representation, of a section of the control and/or regulating system or of the execution of the method according to the invention with the control paths A, B or the sub-paths BA, BB.

As is clear from FIG. 2, in this design a regulating control value RS is first routed to a comparing element 1, in particular through a first control path A. Through a second control path B (sub-path BA), an applicable specific stationary regulating control limit value $GRS_{stationary}$ is first routed to a circuit element 2 from saved/stored characteristic maps or stored stationary regulating control limit curves $GRS_{Curve\_stationary}$, on the one hand as a function of the relevant actual load point of the internal combustion engine and/or the actual speed of the internal combustion engine, wherein, again as a function of the relevant actual load point and/or the relevant actual speed of the internal combustion engine, a relevant characteristic delay time $t_{BRc}$, which corresponds to a delay time until the internal combustion engine has achieved its new, stationary heating state for the relevant actual load point $LP_{Actual}$, is routed to the same circuit element 2 in parallel through the control path/sub-path BB. The circuit element 2, designed as a time delay element, then calculates from the relevant stationary regulating control limit value $GRS_{stationary}$, as a function of the relevant value of the relevant characteristic delay time $t_{BRc}$, a thusly determined/calculated dynamic regulating control limit value $GRS_{dynamic}$, which is routed to the comparing element 1. The so-called "selection of the minimum" then takes place here; the lower of the values routed to the comparing element 1 is selected or used for carrying out the method according to the invention, as already described above. The execution of this abovementioned regulation takes place in particular constantly or continuously during a load jump or a desired load increase.

A control and/or regulating circuit is provided that has at least one first circuit element 1 designed as a comparing element and at least one second circuit element 2 designed as a time delay element. Firstly, the regulating control values RS that are fundamentally stored in the engine control unit by the engine control unit are routed to the first circuit element 1 through a first control path A. A second control path B is provided that has two sub-paths BA and BB, wherein a stationary regulating control limit value GRS is routed to the second circuit element 2 through a first sub-path BA and a value $t_{BRc}$ for a "characteristic delay time" is routed through the second sub-path BB. The second circuit element 2 determines a dynamic regulating control limit value $GRS_{dynamic}$ based on the value routed to the second circuit element 2.

The selection of a minimum and/or a comparison takes place with the aid of the first circuit element 1, wherein the dynamic regulating control limit value $GRS_{dynamic}$ of the second circuit element 2 is routed to the first circuit element 1, wherein the relevant lower value or control value is used for driving the relative location of the intake camshaft.

By way of example, when the value 0.95, in particular, is routed to the comparing element 1 as regulating control value RS between the times $t_2$ and $t_3$ and the value 0.85 is routed to it as dynamic regulating control limit value $GRS_{dynamic}$, for example, the value 0.85 is then used here for moving the intake camshaft as the lower value for control/adjustment of the intake camshaft. Thus, the smaller value/control value is used so that the movement of the intake camshaft is limited to a lower value, which is to say a movement of the intake camshaft in the "late" direction is limited to a maximum of the lower value/control value.

At this point it should be mentioned that it is possible to implement an absolute camshaft position, an offset from the position in stationary operation, or an interpolation factor between two defined camshaft limit locations, or a phase shift for the purpose of defining the permissible camshaft positioning travel or, in other words, for the movement of the intake camshaft. A corresponding value such as, in particular, between "0" and "1" for a movement of the intake camshaft from "early" to "late" (or vice versa) in the above example can then appropriately correspond to this example.

A significant advantage of the method according to the invention over the methods known hitherto is essentially the continuous, in particular constant, adjustment of the intake camshaft positioning travel limits to the preceding actual load conditions of the internal combustion engine. Deactivation of intake camshaft movement is no longer necessary.

In the method according to the invention, firstly, a maximum permissible positioning travel of the intake camshaft in the thermally settled state, in particular an applicable specific stationary regulating control limit value $GRS_{stationary}$, is associated with each achievable actual load point as a parameter set. If the internal combustion engine is at a specific stationary actual load point, then the relevant defined and/or calculated regulating control value RS is applicable for the movement of the intake camshaft. In the event of a change to a more heavily thermally loaded operating point, which is to say in the case of a load increase of the internal combustion engine, a dynamic regulating control limit value $GRS_{dynamic}$ is determined. In order to determine the dynamic regulating control limit value $GRS_{dynamic}$, a stationary regulating control limit value $GRS_{stationary}$ is tracked with the typical/characteristic time behavior ($t_{BRc}$) for the heating of the combustion chamber, while a selection of the minimum from the regulating control values and the dynamic regulating control limit values then takes place for controlling the intake camshaft, in particular, and the lower value of these two control values is used as the control value to limit the movement of the intake camshaft in the "late" direction. A selection of a maximum takes place for the adjustment/control of the exhaust camshaft. This also merits being mentioned again at this point.

As a result, the abovementioned disadvantages are avoided, and corresponding advantages are achieved.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for controlling or regulating an operation of an internal combustion engine, the method comprising:
    applying multiple different target load points from an actuation of the accelerator pedal to the internal combustion engine, wherein in a case of a load increase of the internal combustion engine starting from at least one specific applied, lower first target load point, a specific, higher, second target load point, compared to a first target load point of the multiple different target load points, is applied; and
    moving positioning of an intake camshaft with respect to a crankshaft in order to control intake valves, a relevant control of the intake valves from early to late being implemented through a relative position of an intake camshaft, wherein relevant specific relative locations of the intake camshaft with respect to the crankshaft are controlled with by regulating control values of the engine control unit to control the intake valves between the control value 1 for late and the control value 0 for early, and wherein at least for a specific control period for implementing the load increase, and specific regulating control values for controlling the relative position of the intake camshaft are stored,
    wherein, at least for the specific control period, specific regulating control limit values are defined,
    wherein, then at specific relevant times within the specific control period a comparison of the relevant regulating control values with the relevant regulating control limit values takes place, and
    wherein a relevant lower control value is then used to drive a relative location of the intake camshaft.

2. The method according to claim 1, wherein, through a use of the relevant lower control value, a movement of the intake camshaft in the late direction is appropriately limited to this corresponding value or control value.

3. The method according to claim 1, wherein, during the specific control period, relevant specific stationary regulating control limit values are defined for multiple specific relevant actual load points.

4. The method according to claim 1, wherein the specific regulating control limit values have been determined for stationary actual load points on a test stand for stationary specific actual load conditions.

5. The method according to claim 1, wherein the specific regulating control limit values are stored in the engine control unit as a characteristic map or as a stationary regulating control limit curve.

6. The method according to claim 1, wherein, with aid from the relevant specific regulating control limit values dynamic regulating control limit values are determined as a function of a combustion chamber heating.

7. The method according to claim 6, wherein the relevant dynamic regulating control limit values are used as the relevant regulating control limit values in a comparison.

8. The method according to claim 1, wherein the pressure in the intake system is at least partially controlled by an exhaust-gas turbocharger.

9. The method according to claim 1, wherein relevant characteristic delay times are determined on a test stand, wherein the relevant values of characteristic delay times then each correspond to a relevant delay time until the internal combustion engine has reached its new heating state.

10. The method according to claim 1, wherein the internal combustion engine is an Otto engine.

11. The method according to claim 1, wherein a control or regulating circuit is provided that has at least one first circuit element designed as a comparing element and at least one second circuit element designed as a time delay element.

12. The method according to claim 11, wherein the regulating control values that are stored in the engine control unit by the engine control unit are routed to the first circuit element through a first control path.

13. The method according to claim 12, wherein a second control path is provided that has two sub-paths, wherein a stationary regulating control limit value is routed to the second circuit element through a first sub-path of the two sub-paths, and a value for a characteristic delay time for a combustion chamber heating is routed through a second sub-path of the two sub-paths.

14. The method according to claim 13, wherein the second circuit element determines a dynamic regulating control limit value based on the value of the characteristic delay time routed to the second circuit element.

15. The method according to claim 14, wherein a comparison is performed by the first circuit element, wherein the dynamic regulating control limit value of the second circuit element is routed to the first circuit element, wherein the relevant lower control value is used for driving the relative location of the intake camshaft.

16. The method according to claim 1, wherein the internal combustion engine is for a motor vehicle and operates at least partially according to a Miller cycle.

17. The method according to claim 1, wherein the multiple different target load points correspond to different actual load points of the internal combustion engine,
    wherein the at least one specific applied, lower first target load point is a first actual load point implemented for the first target load point,
    wherein the first target load point is a first actual load point,
    wherein moving the position involves adjusting a relative location of the intake camshaft with respect to the crankshaft,
    wherein the at least for a specific control period for implementing the load increase is at least between a first time at the start of the target load increase to a second time at the end of the actual load increase corresponding to the target load increase, wherein a specific regulating control value curve includes the specific regulating control values, and wherein a regulating control limit curve includes the specific regulating control limit values.

18. The method according to claim 1, wherein a dynamic regulating control limit curve is determined from the regulating control limit curve as a function of a curve of a combustion chamber heating.

19. The method according to claim 1, the method further comprising:

applying the multiple different target load points from the actuation of the accelerator pedal to different actual load points of the internal combustion engine, wherein the multiple different target load points correspond in time to the different actual load points of the internal combustion engine.

* * * * *